(12) United States Patent
Takahashi (10) Patent No.: US 9,467,538 B2
(45) Date of Patent: Oct. 11, 2016

(54) PORTABLE ELECTRONIC DEVICE (71) Applicant: KYOCERA Corporation, Kyoto-shi, Kyoto (JP)

(72) Inventor: Daisuke Takahashi, Neyagawa (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/433,616

(22) PCT Filed: Oct. 1, 2013

(86) PCT No.: PCT/JP2013/076720
§ 371 (c)(1),
(2) Date: Apr. 3, 2015

(87) PCT Pub. No.: WO2014/054645
PCT Pub. Date: Apr. 10, 2014

(65) Prior Publication Data
US 2015/0281410 A1 Oct. 1, 2015

(30) Foreign Application Priority Data
Oct. 4, 2012 (JP) ................. 2012-221839

(51) Int. Cl.
*H04M 1/00* (2006.01)
*H04M 1/02* (2006.01)
(52) U.S. Cl.
CPC .............. *H04M 1/02* (2013.01); *H04M 1/026* (2013.01)
(58) Field of Classification Search
CPC ..................... H04B 1/3888; H04B 2001/3894
USPC .................................. 455/575.1, 575.8, 90.3
See application file for complete search history.

(56) References Cited

U.S. PATENT DOCUMENTS

2011/0021164 A1* 1/2011 Perriello ............... H01H 13/06
455/90.3
2011/0045882 A1* 2/2011 Yamaguchi .......... H04M 1/216
455/575.8

(Continued)

FOREIGN PATENT DOCUMENTS

| JP | 2010-226531 A | 7/2010 | |
| JP | 2011-239099 | * 11/2011 | ............. H04M 1/18 |
| JP | 2011-239099 A | 11/2011 | |

OTHER PUBLICATIONS

International Search Report dated Jan. 14, 2014 issued in counterpart International application No. PCT/JP2013/076720.

*Primary Examiner* — Ping Hsieh
(74) *Attorney, Agent, or Firm* — Procopio Cory Hargreaves and Savitch LLP (57) ABSTRACT

A portable electronic device according to the present invention is provided with a casing formed by joining two cabinets together. A housing chamber for an electric component is recessed on at least either one cabinet and is open toward an inner face of the other cabinet. Mating surfaces located on both the cabinets overlap each other around the housing chamber. A water entry portion leading to a clearance between the mating surfaces is located on an exposed surface exposed to the outside of the casing in an upper part of the casing. A groove extending in a right-left direction along the hosing chamber is recessed on the mating surface of at least either one cabinet of the two cabinets at a position away upward from the housing chamber.

7 Claims, 8 Drawing Sheets

(56) References Cited

U.S. PATENT DOCUMENTS

2012/0322516 A1\* 12/2012 Kitagawa ............... F16J 15/025
　　　　　　　　　　　　　　　　　　　　　455/575.1

2013/0217451 A1\* 8/2013 Komiyama ........... H04M 1/021
　　　　　　　　　　　　　　　　　　　　　455/575.8
2013/0244737 A1\* 9/2013 Tanaka ............... H01R 13/5213
　　　　　　　　　　　　　　　　　　　　　455/575.1

\* cited by examiner

A-A CROSS SECTION

FIG. 6

ENLARGED PART E

F I G. 7

B-B CROSS SECTION

F I G. 8

ENLARGED PART F

FIG. 9
C-C CROSS SECTION

FIG. 10
ENLARGED PART G

FIG. 11

PORTABLE ELECTRONIC DEVICE

TECHNICAL FIELD

The present invention relates to a portable electronic device such as a mobile phone.

BACKGROUND ART

For example, a mobile phone employs a waterproof structure in which a waterproof packing is interposed between two cabinets which constitute a casing and compressed by the cabinets to seal the inside of the casing.

However, a portable electronic device having a conventional waterproof structure is required to include an additional component such as a waterproof packing.

In view of the above, an object of the present invention is to achieve effective waterproofing with a simple configuration in a portable electronic device which has a water entry portion, such as a terminal portion, located on an upper part of a casing.

SUMMARY OF THE INVENTION

A portable electronic device according to the present invention is provided with a casing formed by joining two cabinets together. A housing chamber for an electric component is recessed on at least one of the two cabinets and is open toward an inner face of the other cabinet. Mating surfaces located on both the two cabinets overlap each other around the housing chamber. A water entry portion leading to a clearance between the mating surfaces is located on an exposed surface exposed to the outside of the casing in an upper part of the casing.

A groove extending in a right-left direction along the hosing chamber is recessed on the mating surface of at least one of the two cabinets at a position away upward from the housing chamber.

DETAILED DESCRIPTION OF EMBODIMENTS

Hereinbelow, an embodiment in which the present invention is embodied as a mobile phone will be specifically described with reference to the drawings.

In the present invention, a face of a casing which faces vertically upward or obliquely upward when a main function of the device is being used (e.g., in a call state in a mobile phone) is defined as an upper face, and an upper part and right and left sides are defined on the basis of the upper face.

As illustrated in FIGS. 1 to 4, the mobile phone as an embodiment of the present invention is provided with a flat casing 1 which is formed by joining a body cabinet 2 and a cover cabinet 3 both made of synthetic resin together. The cover cabinet 3 is detachably locked to the body cabinet 2 by a hook mechanism.

Figure 1:
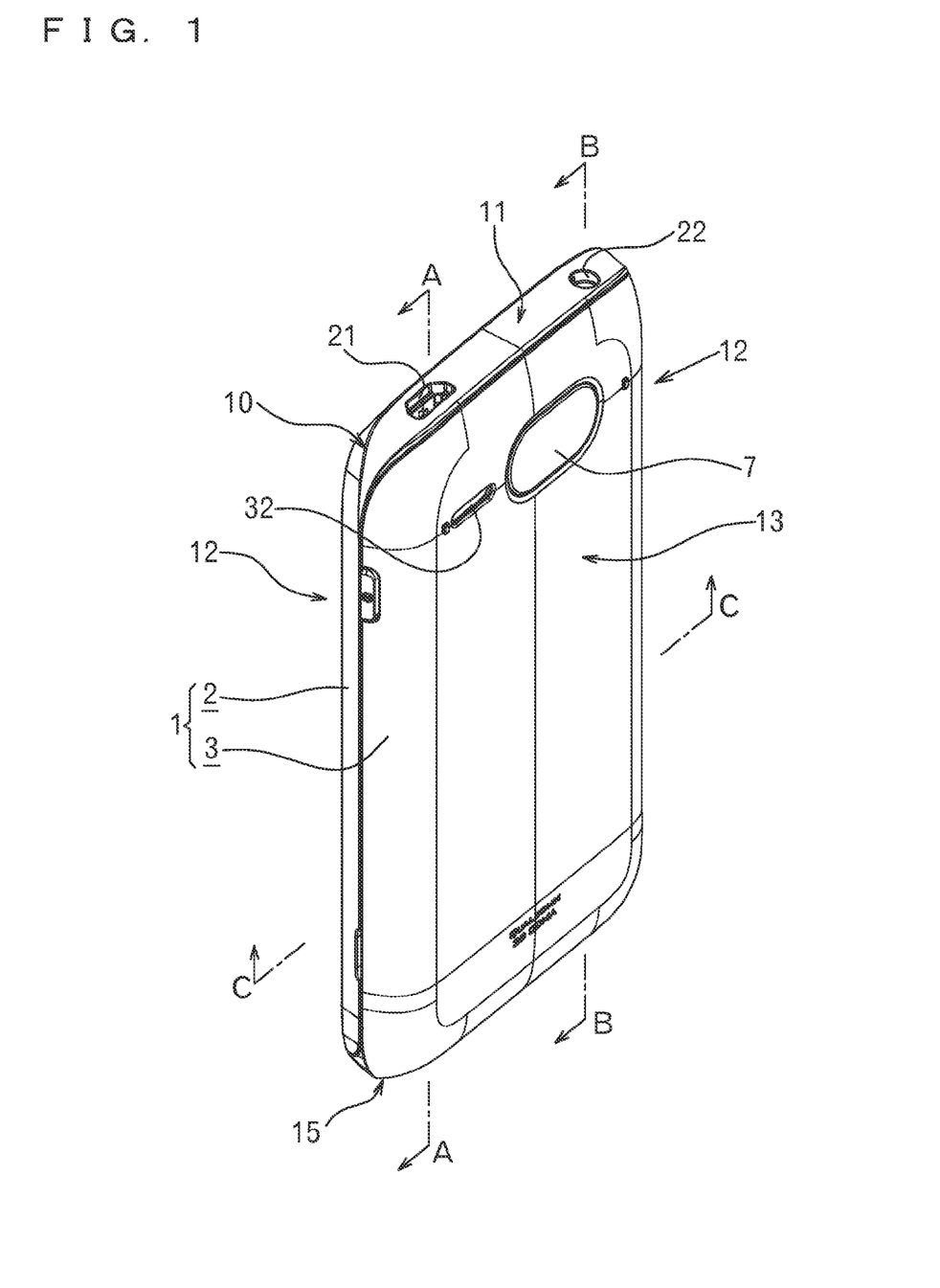
FIG. 1 is a perspective view of a mobile phone as an embodiment of the present invention.

As illustrated in FIG. 1, an outer peripheral wall of the body cabinet 2 and an outer peripheral wall of the cover cabinet 3, the body cabinet 2 and the cover cabinet 3 constituting the casing 1, abut against each other on right and left side faces 12, 12 of the casing 1 as well as on an upper face 11 and a lower face 15 of the casing 1.

A USB port 21 and an earphone jack 22 are located as a terminal portion on the upper face 11 of the casing 1. A speaker hole 32 is formed on a back face 13 of the casing 1. A camera 7 is exposed on the back face 13 of the casing 1.

Figure 3:
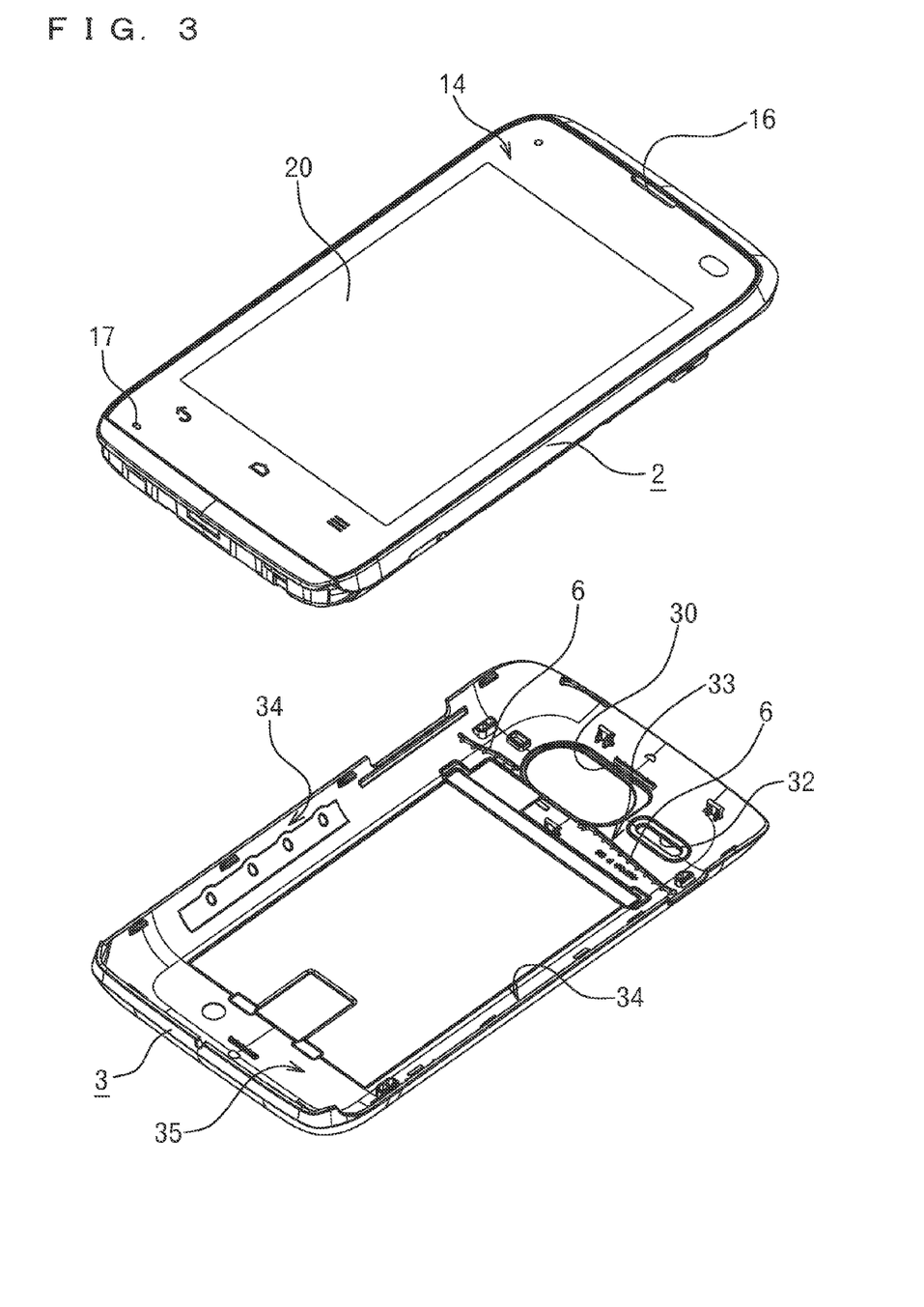
FIG. 3 is a perspective view illustrating the state of FIG. 2 upside down.

A phone call is made using the mobile phone in such a state that the casing 1 is grasped by the hand with the upper face 11 of the casing 1 facing upward (in an inclined posture or a vertical posture) as illustrated in FIG. 1, an earpiece portion 16 which is located on the upper part of the casing 1 as illustrated in FIG. 3 is brought close to the ear, and a mouthpiece portion 17 which is located on the lower part of the casing 1 as illustrated in FIG. 3 is brought close to the mouth.

Figure 2:
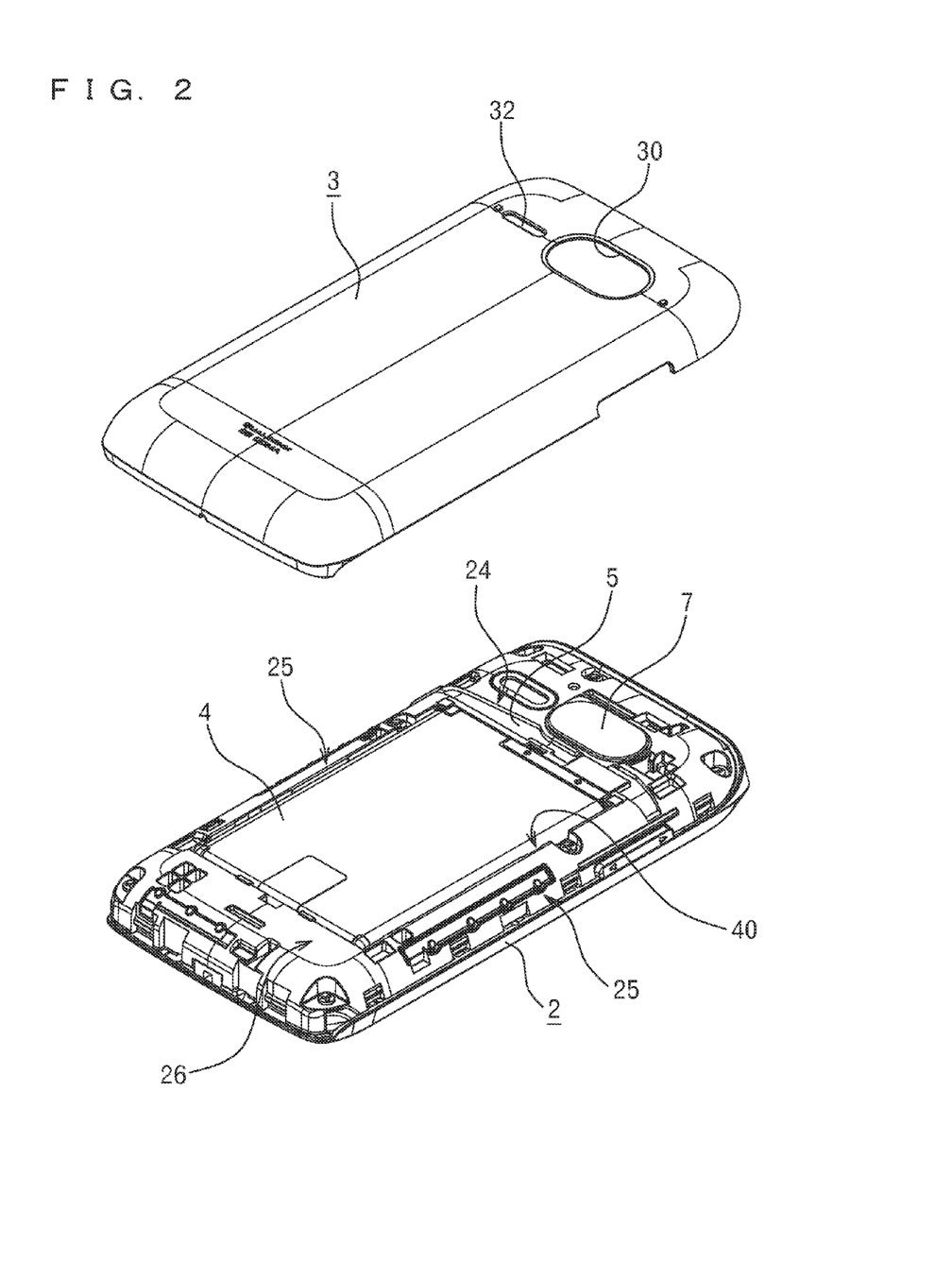
FIG. 2 is a perspective view illustrating a state in which a cover cabinet is detached from a body cabinet in the mobile phone.

As illustrated in FIG. 2, a rectangular parallelepiped housing chamber 40 is recessed on the body cabinet 2 and is open toward the inner face of the cover cabinet 3. A battery 4 as a power source is housed in the housing chamber 40. A circuit board (not illustrated) is placed on the back of the battery 4. Locking the cover cabinet 3 to the body cabinet 2 allows the cover cabinet 3 to close the housing chamber 40 of the body cabinet 2.

The camera 7 is arranged on the body cabinet 2. On the other hand, a photographing window 30 for exposing the camera 7 is open on the cover cabinet 3.

Further, as illustrated in FIG. 3, a screen of a display 20 is disposed on a front face 14 of the body cabinet 2.

As illustrated in FIG. 2, an upper mating surface 24, right and left mating surfaces 25, 25, and a lower mating surface 26 are continuously located on the body cabinet 2 along four sides of the housing chamber 40 so as to surround the housing chamber 40.

On the other hand, as illustrated in FIG. 3, an upper mating surface 33, right and left mating surfaces 34, 34, and a lower mating surface 35 are continuously formed on the cover cabinet 3.

When the cover cabinet 3 is locked to the body cabinet 2, the mating surfaces of the body cabinet 2 overlap the respective mating surfaces of the cover cabinet 3.

Figure 9:
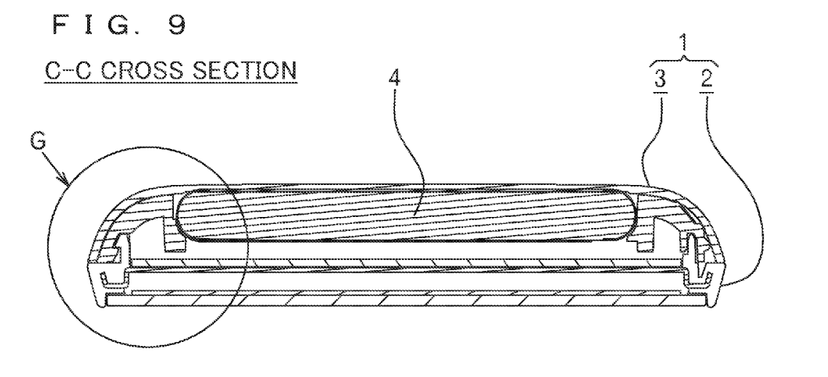
FIG. 9 is a cross-sectional view taken along line C-C of FIG. 1.
Figure 10:
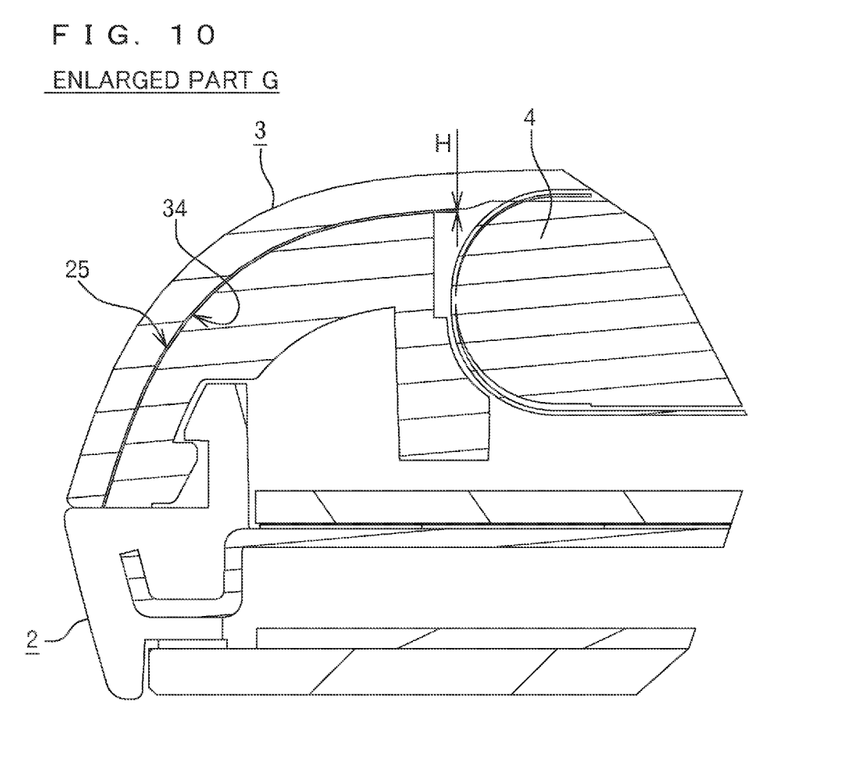
FIG. 10 is an enlarged cross-sectional view of a part G of FIG. 9.

That is, as illustrated in FIGS. 5 to 8, the upper mating surface 24 of the body cabinet 2 and the upper mating surface 33 of the cover cabinet 3 overlap each other. Further, as illustrated in FIGS. 9 and 10, the right and left mating surfaces 25 of the body cabinet 2 and the right and left mating surfaces 34 of the cover cabinet 3 overlap each other. Further, the lower mating surface 26 of the body cabinet 2 and the lower mating surface 35 of the cover cabinet 3 overlap each other.

A tiny clearance (H illustrated in FIG. 1) of approximately 0.05 mm is formed between the mating surfaces of the body cabinet 2 and the cover cabinet 3 in consideration of molding accuracy in both the cabinets 2 and 3.

Thus, when the body cabinet 2 and the cover cabinet 3 abut against each other on their outer peripheral walls, the mating surfaces do not push against each other.

Figure 4:
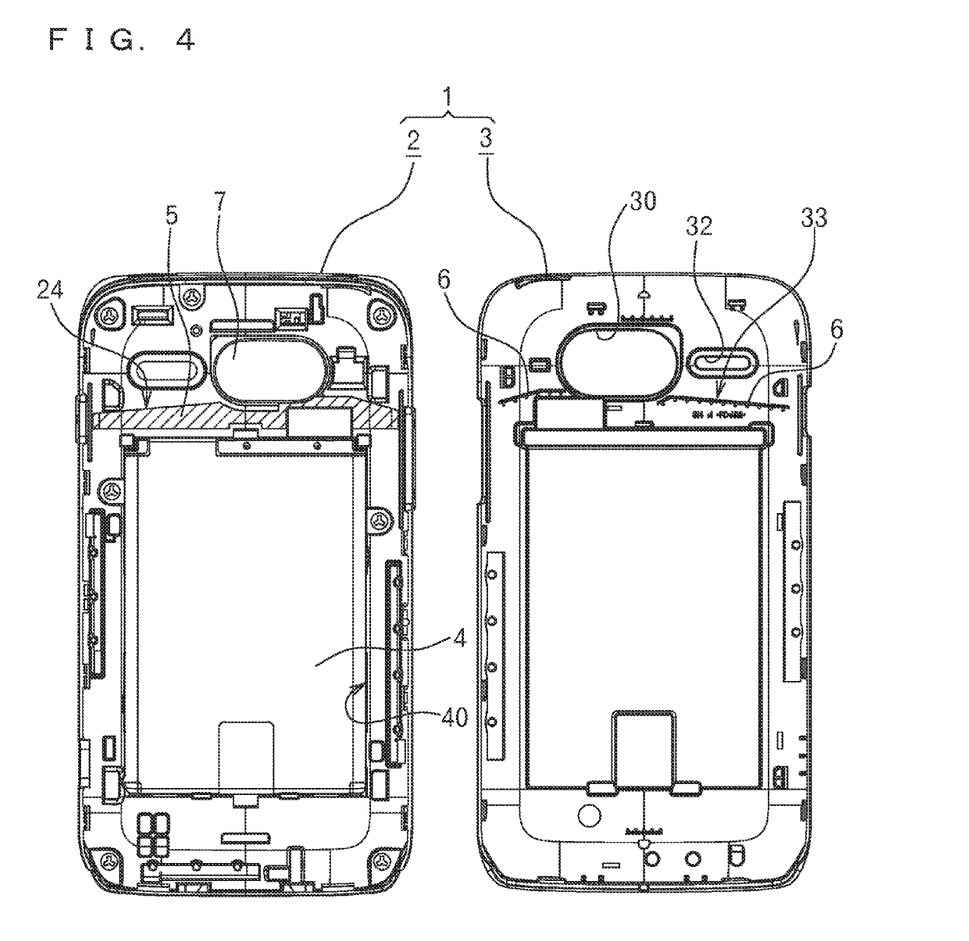
FIG. 4 is a plan view illustrating the configuration on the inner face side of the body cabinet and the cover cabinet.
Figure 5:
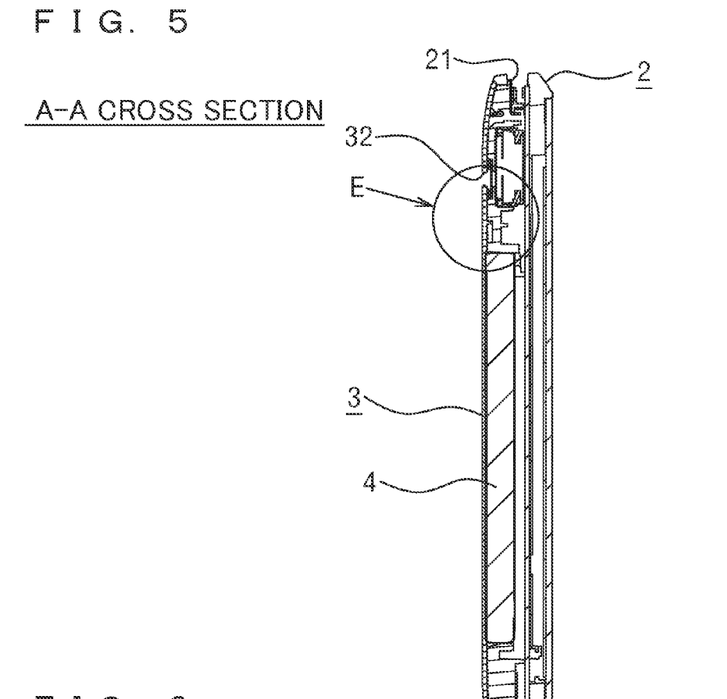
FIG. 5 is a cross-sectional view taken along line A-A of FIG. 1.
Figure 6:
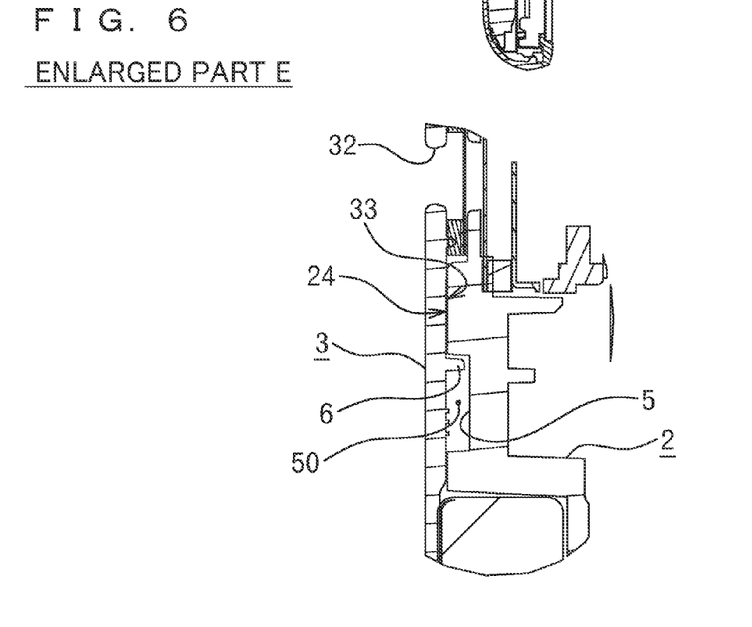
FIG. 6 is an enlarged cross-sectional view of a part E of FIG. 5.
Figure 7:
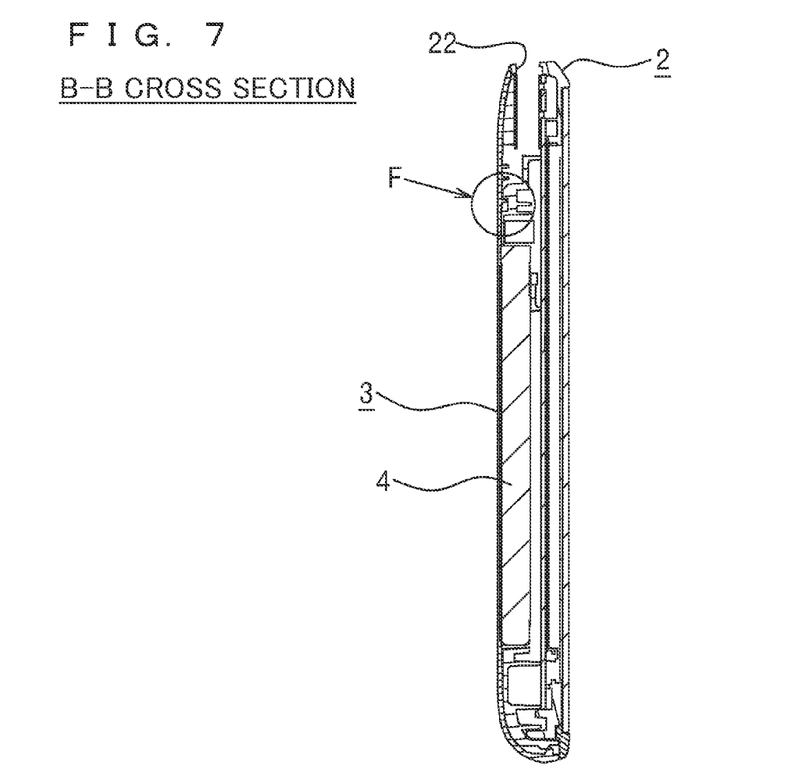
FIG. 7 is a cross-sectional view taken along line B-B of FIG. 1.
Figure 8:
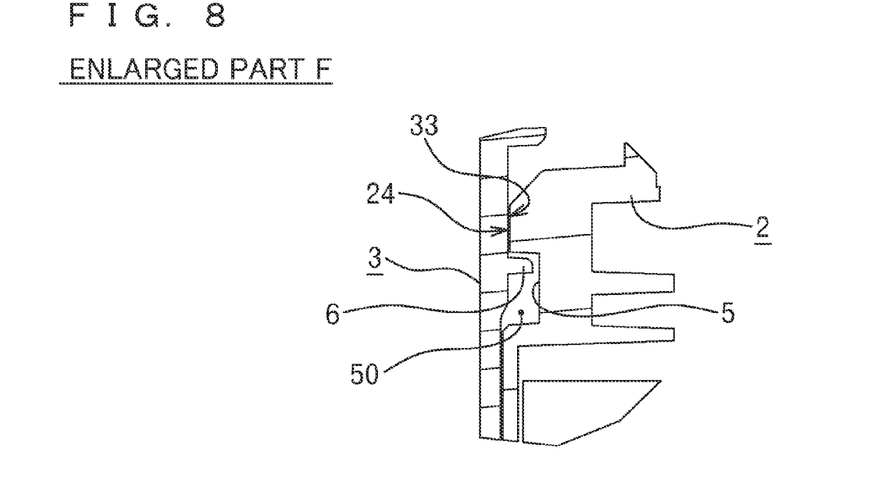
FIG. 8 is an enlarged cross-sectional view of a part F of FIG. 7.

As illustrated in FIGS. 2 and 4, the body cabinet 2 includes a groove 5 which is recessed on the upper mating surface 24 and extends in the right-left direction at a position slightly away from the housing chamber 40. The respective ends of the groove 5 reach the right and left mating surfaces 25, 25. In FIG. 4, an area in which the groove 5 is formed is indicated by hatching.

As illustrated in FIG. 4, an upper wall face of the groove 5 has an inclination which is gradually lowered toward the right and left directions from a position near the camera 7 as a top.

On the other hand, as illustrated in FIGS. 3 and 4, the cover cabinet 3 includes two ribs 6, 6 which project on the upper mating surface 33 and extend in the right-left direction in a manner to face the groove 5 of the body cabinet 2. Ends of the ribs 6, 6 respectively reach the right and left mating surfaces 34, 34.

As illustrated in FIG. 4, the two ribs 6, 6 have an inclination which is gradually lowered toward the right and left directions from a position near the photographing window 30 as a top.

When the cover cabinet 3 is locked to the body cabinet 2, as illustrated in FIGS. 5 to 8, the groove 5 of the body cabinet 2 is closed by the mating surface 24 of the cover cabinet 3, and a space 50 which extends in the right-left direction is thereby formed. Further, the ribs 6 of the cover cabinet 3 are housed in the groove 5 of the body cabinet 2, and a tiny clearance of approximately 0.1 mm is thereby formed between the ribs 6 and the inner face (the bottom face and the upper wall face) of the groove 5.

Figure 11:
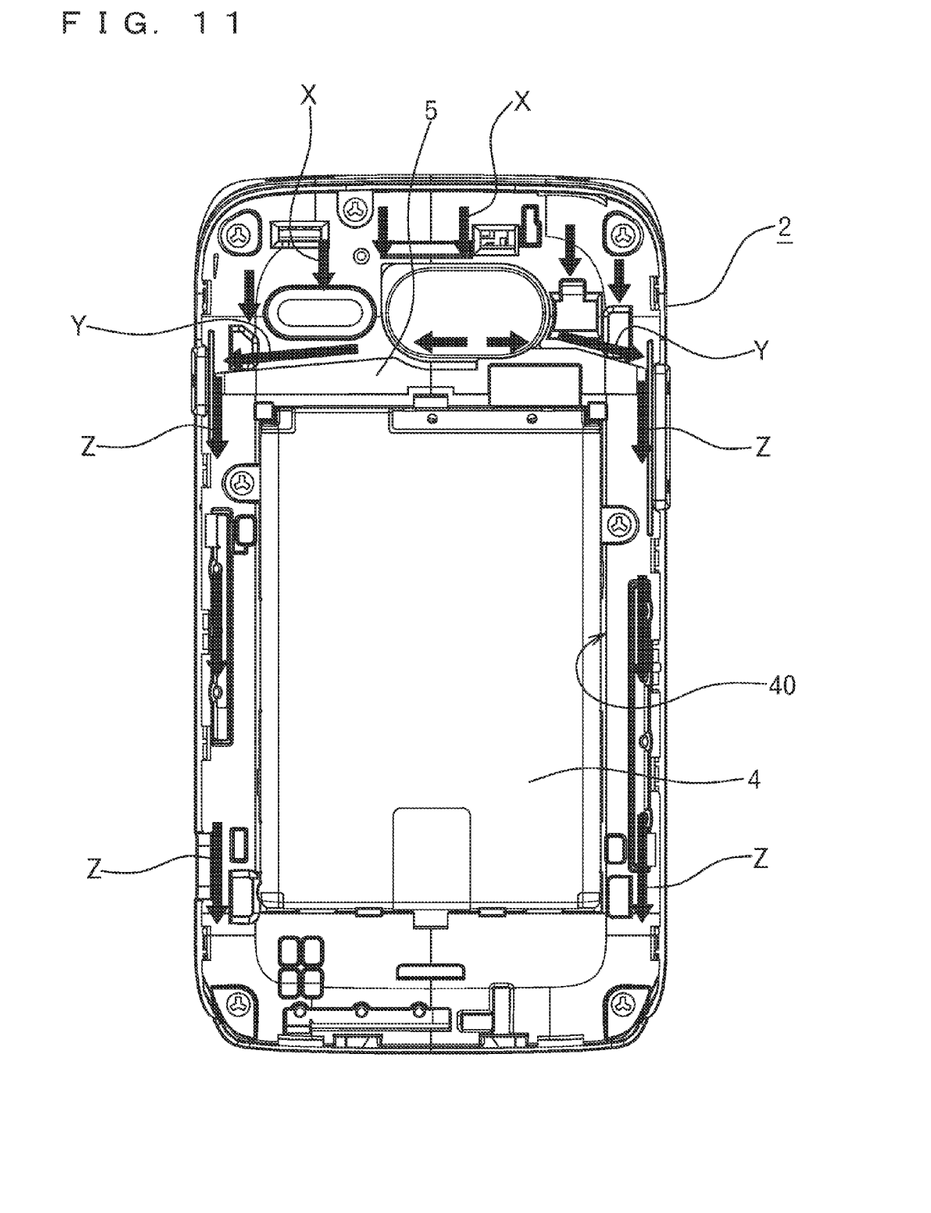
FIG. 11 is a diagram illustrating the flow of water that has entered a casing.

When water enters the mobile phone, for example, through the USB port 21 or the earphone jack 22 located on the upper face 11 of the casing 1, the speaker hole 32 open on the back face 13 of the casing 1, or a clearance on an abutment portion 10 between the cabinets 2 and 3 exposed on the upper face 11 of the casing 1 in a process of making a call or performing an input operation in a state in which the casing 1 is grasped by the hand with the upper face 11 of the casing 1 facing upward as illustrated in FIG. 1, the water first flows into a clearance between the mating surfaces located above the housing chamber 40 under the action of gravity as indicated by arrows X of FIG. 11.

Then, the water flows toward the groove 5 located on the lower side by the action of gravity. However, since the clearance between the mating surfaces is significantly smaller than the depth of the groove 5 in a direction perpendicular to the mating surfaces, the water flowing toward the groove 5 is sucked into the clearance by a capillary phenomenon generated in the clearance. As a result, the water flows through the clearance toward both sides of the casing 1 as indicated by arrows Y.

A flow path which is inclined downward along the upper wall face of the groove 5 is formed in the clearance. Thus, water inside the clearance smoothly flows through the flow path toward both sides of the body cabinet 2 under the action of gravity.

Then, the water flows into the clearances between the mating surfaces located on the right and left sides of the housing chamber 40, and flows through the clearances toward the lower side as indicated by arrows Z.

In this manner, a flow path which bypasses the housing chamber 40 is formed. The water is discharged from the lower part of the casing 1 after flowing through the flow path, or retained inside the flow path and gradually evaporates. Thus, the possibility of water entering the housing chamber 40 of the casing 1 is low.

Even when part of water that has flowed into the clearance between the mating surface 24 of the body cabinet 2 and the mating surface 33 of the cover cabinet 3 flows into the groove 5, the water that has flowed into the groove 5 is retained in the clearance formed between the ribs 6 which project on the mating surface 33 of the cover cabinet 3 and the inner face of the groove 5 which is located on the mating surface 24 of the body cabinet 2, the clearance being smaller than the depth of the groove 5, by a capillary phenomenon. Thus, the possibility of water flowing into the housing chamber 40 through the groove 5 is extremely low.

Also in a conventional mobile phone, the mating surfaces of the body cabinet 2 and the cover cabinet 3 are formed to surround the housing chamber 40. However, the groove 5 is not formed on the mating surface 24 in a conventional mobile phone. Thus, water enters the housing chamber 40 through the clearance between the mating surfaces 24 and 33.

The mobile phone of the present invention makes it possible to achieve effective waterproofing using a capillary phenomenon with the simple configuration in which the groove 5 is merely recessed on the mating surface 24 of the body cabinet 2 of the casing 1. Further, the groove 5 can be formed simultaneously with resin molding for the body cabinet 2. Thus, the number of components and the number of steps in a manufacturing process are not likely to increase.

DESCRIPTION OF REFERENCE CHARACTERS 1 casing
11 upper face
2 body cabinet
3 cover cabinet
21 USB port
22 earphone jack
32 speaker hole
24 mating surface
33 mating surface
4 battery
40 housing chamber
5 groove
6 rib

The invention claimed is:
1. A portable electronic device comprising:
a casing formed by joining two cabinets together;
a housing chamber recessed on at least one of the two cabinets, the housing chamber being open toward an inner face of the other cabinet and housing an electric component;
mating surfaces located on both the two cabinets, the mating surfaces overlapping each other with a clearance, the clearance being formed therebetween on at least upper and side regions of the housing chamber and having a distance that causes a capillary phenomenon of water;
a water entry portion located on an exposed surface exposed to the outside of an upper part of the casing, the water entry portion extending to the clearance of the mating surfaces; and
a groove recessed on the mating surface of the at least one cabinet, the groove extending in a transverse direction along the housing chamber at a position above the housing chamber and below the clearance formed on the upper region of the housing chamber, the groove having a width that is large enough not to cause a capillary phenomenon of water.

2. The portable electronic device according to claim 1, wherein a terminal portion for electrical connection is located on an upper face of the casing, and the terminal portion forms the water entry portion.

3. The portable electronic device according to claim 1, wherein an upper face of the casing has an abutment portion formed by abutting outer peripheral walls of the two cabinets against each other, and the abutment portion forms the water entry portion.

4. The portable electronic device according to claim 1, wherein the mating surfaces of the two cabinets surround the entire circumference of the housing chamber.

5. The portable electronic device according to claim 1, wherein an upper wall face of the groove is inclined away from an upper face of the casing to be closer to the housing chamber.

6. The portable electronic device according to claim 1, wherein a rib which projects toward the inside of the groove of the one cabinet and extends along an upper wall face of the groove is located on the mating surface of the other cabinet.

7. The portable electronic device according to claim 1, wherein no waterproof packing is interposed on the clearance between the mating surfaces.

* * * * *